(12) United States Patent
Gailloux et al.

(10) Patent No.: US 8,055,238 B1
(45) Date of Patent: Nov. 8, 2011

(54) PREPAID HANDSET CREDIT ACTIVATION

(75) Inventors: Michael A. Gailloux, Overland Park, KS (US); Kenneth Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 386 days.

(21) Appl. No.: 12/265,424

(22) Filed: Nov. 5, 2008

(51) Int. Cl.
H04M 11/00 (2006.01)
(52) U.S. Cl. ........ 455/406; 455/403; 455/405; 455/407; 455/418; 455/558; 370/235
(58) Field of Classification Search .................. 455/406, 455/407, 405, 403, 418, 558
See application file for complete search history.

(56) References Cited

U.S. PATENT DOCUMENTS

| | | | |
|---|---|---|---|
| 7,155,206 B2 * | 12/2006 | Allison et al. | 455/406 |
| 2005/0195743 A1 * | 9/2005 | Rochberger et al. | 370/235 |
| 2006/0217106 A1 * | 9/2006 | Davidson et al. | 455/405 |
| 2008/0254766 A1 * | 10/2008 | Craven | 455/407 |

* cited by examiner

Primary Examiner — Charles Appiah
Assistant Examiner — Michael Vu

(57) ABSTRACT

A system is provided for prepaid handset credit activation. The system includes a prepaid handset, a subscriber identity module, and a server. The prepaid handset is associated with a prepaid handset identifier. The subscriber identity module is associated with a subscriber identity module identifier. The server communicates with a communication device to receive the prepaid handset identifier and the subscriber identity module identifier and determines whether both of the prepaid handset identifier and the subscriber identity module identifier are associated with prior activation. The server also applies credit to account information associated with the prepaid handset in response to a determination that both of the prepaid handset identifier and the subscriber identity module identifier are not associated with the prior activation, and activates the prepaid handset for user communication in response to applying credit to the account information associated with the prepaid handset.

19 Claims, 6 Drawing Sheets

PREPAID HANDSET CREDIT ACTIVATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A handset may be a mobile phone, a wireless handset, a pager, a personal digital assistant, a gaming device, an inventory control device, a media player, a digital camera, a digital calculator, a portable computer, a tablet computer, or a laptop computer. Many mobile phones, and other types of handsets, have become so inexpensive to purchase and use that many customers may purchase a prepaid mobile phone at a convenience store, activate the phone, use the phone, and discard the phone when a prepaid service plan's usage limit is reached.

SUMMARY OF THE INVENTION

In some embodiments, a system is provided for prepaid handset credit activation. The system includes a prepaid handset, a subscriber identity module, and a server. The prepaid handset is associated with a prepaid handset identifier. The subscriber identity module is associated with a subscriber identity module identifier. The server communicates with a communication device to receive the prepaid handset identifier and the subscriber identity module identifier and determines whether both of the prepaid handset identifier and the subscriber identity module identifier are associated with a prior activation. The server also applies credit to account information associated with the prepaid handset in response to a determination that both of the prepaid handset identifier and the subscriber identity module identifier are not associated with the prior activation, and activates the prepaid handset for user communication in response to applying the credit to the account information associated with the prepaid handset.

In some embodiments, a method is provided for prepaid handset credit activation. A prepaid handset identifier and a subscriber identity module identifier are received. Whether either of the prepaid handset identifier and the subscriber identity module identifier are associated with a prior activation is determined. Credit is applied to account information associated with a prepaid handset in response to a determination that neither of the prepaid handset identifier and the subscriber identity module identifier are associated with the prior activation. The prepaid handset is activated for user communication in response to applying the credit to the account information associated with the prepaid handset.

In some embodiments, a system includes a prepaid handset, a subscriber identity module, and a server. The prepaid handset is associated with a prepaid handset identifier. The subscriber identity module includes a stored value, and is associated with a subscriber identity module identifier. The server communicates with a communication device to receive the prepaid handset identifier and the subscriber identity module identifier and communicates with the subscriber identity module via the prepaid handset. The server also applies credit to account information associated with the prepaid handset based on the stored value, and activates the prepaid handset for user communication.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
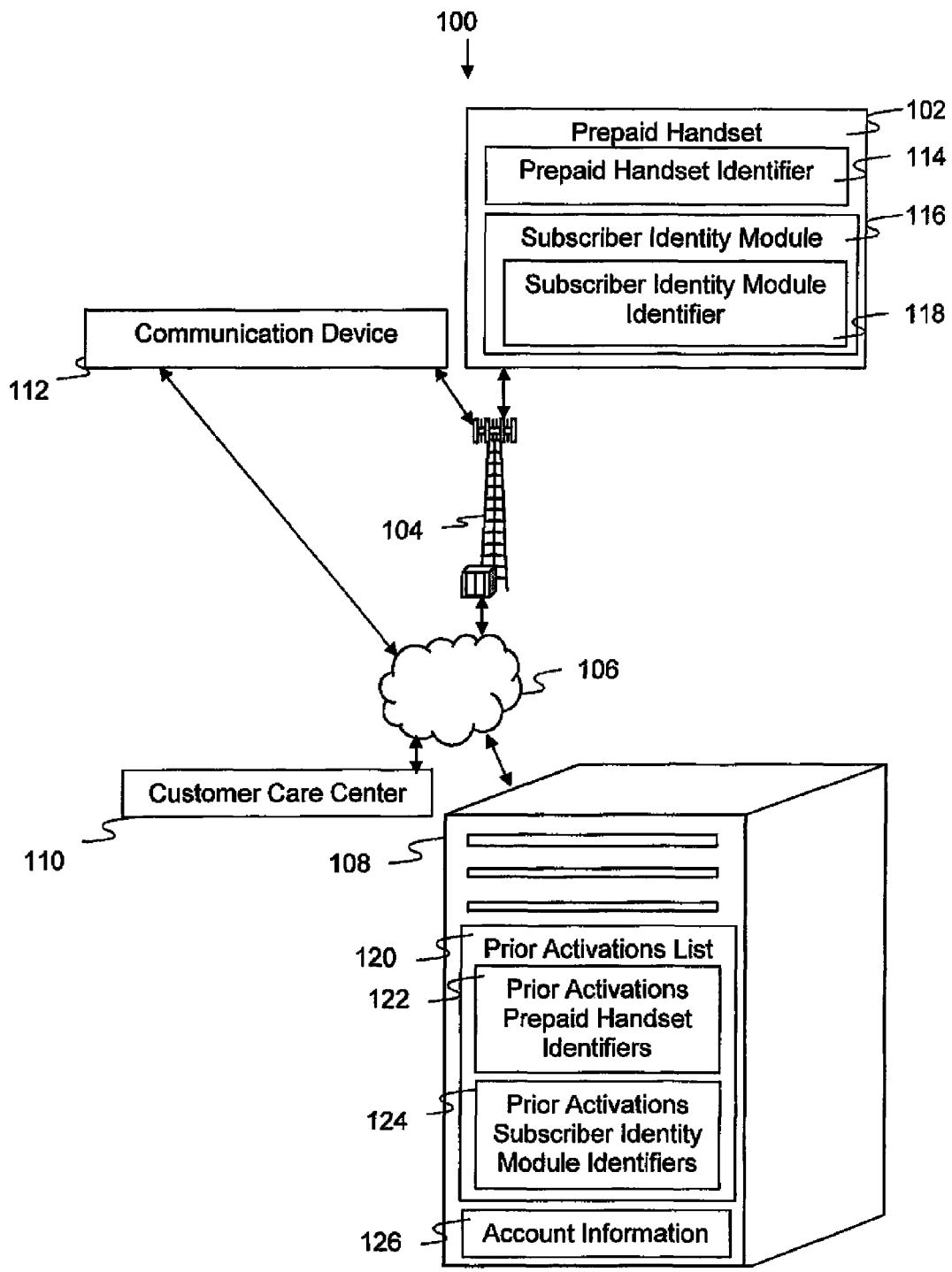
FIG. 1 shows a block diagram of a system for prepaid handset credit activation according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A prepaid handset may need to be activated before a customer can communicate using the handset. A customer may purchase a prepaid handset package that includes the handset itself, a subscriber identity module (SIM), and a credit account card. The customer may use another communication device, such as a telephone, another handset, or a personal computer, to contact a service to activate the newly purchased handset. The service may be a customer care center or an automated interactive voice message system that prompts the customer to enter identifying numbers provided by the prepaid handset package. The customer may respond by entering an identifying number for the handset, an identifying number for the SIM, and an identifying number for the credit account card. If the customer entered the numbers correctly and the numbers are valid, the service activates the handset for customer communication, limited to the amount of communication specified by the credit account card. If the customer purchases additional credit account cards, contacts the service, and enters the credit account card numbers for these cards, the service adds additional credit to the customer's account information, thereby enabling additional customer communication on the handset. However, the identifying numbers are typically many digits, such that customers may make an error when entering these numbers. If the customer makes an error entering even one digit out of the many digits in the numbers, the service may not activate the handset. Customer care centers spend a significant amount of time and resources in assisting customers to activate their handsets due to such errors.

In some embodiments, a system is provided for prepaid handset credit activation. A system server receives the prepaid handset number and the SIM number from a communication device. The server uses a list of previously activated handset numbers and SIM numbers to determine whether either the handset number or the SIM number was previously used to activate a handset. If either the handset number or the SIM number was not previously used to activate any handset, the server applies a predetermined credit amount to the handset's account information. In some embodiments, if neither the handset number nor the SIM number was previously used to activate any handset, the server applies a predetermined credit amount to the handset's account information. Then the server activates the handset for customer communication. Following activation, the server uses the handset number and the SIM number to update the list of previously activated handset numbers and SIM numbers. The customer does not have to enter a lengthy credit account card number because the server determines whether the customer has purchased a new handset, a new SIM card, or both. Such a purchase means that an amount already included in its price can be added to the handset's account information.

In some embodiments, the server receives the prepaid handset number and the SIM number from a communication device. Based on the prepaid handset number and the SIM number, the server communicates via the handset with the SIM to access a stored credit value. The server applies the stored credit value to the handset's account information and activates the handset for customer communication. The customer does not have to enter a lengthy credit account card number because the SIM stores the credit value to be added to the handset's account information. In all embodiments, prompting customers to enter fewer numbers, such as a 14 digit credit account card number, may result in fewer data entry errors, fewer calls to customer care centers, reduced customer care expenses, and increased customer satisfaction. Additionally, a network service provider may reduce expenses paid to any third-party credit account card providers because the system server does not use credit account cards or credit account card numbers.

FIG. 1 shows a block diagram of a system 100 for prepaid handset credit activation according to an embodiment of the present disclosure. The system 100 includes a prepaid handset 102, a base transceiver station 104, a network 106, a server 108, a customer care center 110, and a communication device 112. The handset 102, which may be a handset that uses a prepaid billing plan, communicates with the base transceiver station 104, which is coupled to the network 106. The network 106 may enable the handset 102 to access information on various servers, such as the server 108, and to access a customer care center 110 for assistance with communication services. The server 108 may communicate with the customer care center 110. The communication device 112, which may be a personal computer, a telephone, or another handset, may communicate with either the server 108 or the customer care center 110 via the network 106 or via the base transceiver station 104 and the network 106.

The prepaid handset 102 has a prepaid handset identifier 114 and includes a subscriber identity module 116. The subscriber identity module 116 has a subscriber identity module identifier 118 and may include a stored value, such as a specific number of minutes for customer communication. The subscriber identity module (SIM) 116 on a removable SIM card securely stores the subscriber identity module identifier 118 used to identify a subscriber on mobile telephony devices (such as computers) and mobile phones. The SIM card allows users to change phones by simply removing the SIM card from one mobile phone and inserting it into another mobile phone or broadband telephony device. The subscriber identity module identifier 118 is sent by the phone to a communication network. The subscriber identity module identifier 118 is usually 15 digits long, but can be shorter. The first 3 digits are the mobile country code, and are followed by the mobile network code (MNC), either 2 digits (European standard) or 3 digits (North American standard). The remaining digits are the mobile subscriber identification number (MSIN) within the network's customer base.

The server 108 may access a prior activations list 120, which includes prior activations prepaid handset identifiers 122, prior activations subscriber identity module identifiers 124, and account information 126. Although FIG. 1 depicts the prior activations list 120 and the account information 126 as resident on the server 108, the prior activations list 120 and/or the account information 126 may reside elsewhere.

The server 108 receives the prepaid handset identifier 114 and the subscriber identity module identifier 118 from the communication device 112. The server 108 may communicate with the communication device 112 via the customer care center 110, or via the network 106 using a web browser, text messages, or an automated interactive voice message system. When the customer uses either a web browser or text messages to communicate with the server 108, the customer may visually review any entered numbers prior to submitting the numbers. This visual review may enable the customer to correct errors and typos that may not have been corrected if the customer used the automated interactive voice message system or spoke with a customer care representative at the customer care center 110.

In some embodiments, the server 108 determines whether either the prepaid handset identifier 114 or the subscriber identity module identifier 118 were used for a prior activation based on the prior activations list 120, which includes the prior activations prepaid handset identifiers 122 and the prior activations subscriber identity module identifiers 124. If the server 108 accesses the prior activations list 120 and determines that either the prepaid handset identifier 114 or the subscriber identity module identifier 118 was not used for a prior activation, the server 108 applies a predetermined credit amount to the account information 126 for the prepaid handset 102. In some embodiments, the server 108 determines whether neither the prepaid handset identifier 114 nor the subscriber identity module identifier 118 were used for a prior activation based on the prior activations list 120. If the server 108 accesses the prior activations list 120 and determines that neither the prepaid handset identifier 114 nor the subscriber identity module identifier 118 was used for a prior activation, the server 108 applies a predetermined credit amount to the account information 126 for the prepaid handset 102.

Both the prepaid handset identifier 114 and the subscriber identity module identifier 118 may be checked for any prior activation because the customer may want to use a previously activated subscriber identity module 116 with a newly purchased handset 102 to retain their old phone number while upgrading to a handset with more capabilities. In another example, the customer may want to use an old handset 102 with a newly purchased subscriber identity module 116 because the customer wants to change their phone number but wants to keep using their old handset 102. In yet another example, the customer may want to use a newly purchased handset 102 with a newly purchased subscriber identity module 116. In each example, the customer has paid for a new handset package, including the predetermined credit amount for activating the new combination of the handset 102 and the subscriber identity module 116. Therefore, if either the prepaid handset identifier 114 or the subscriber identity module identifier 118 were not used for a prior activation, the server 108 may apply the predetermined credit amount to the account information 126 for the prepaid handset 102. In some embodiments, the server 108 provides prepaid handset credit activations only for a combination of a newly purchased handset 102 with a newly purchased subscriber identity module 116. For these embodiments, if neither the prepaid handset identifier 114 nor the subscriber identity module identifier 118 were used for a prior activation, the server 108 may apply the predetermined credit amount to the account information 126 for the prepaid handset 102.

In other embodiments, the server 108 communicates via the prepaid handset 102 with the subscriber identity module 116, which includes a stored credit value. The server 108 may apply the stored credit value to the account information 126 for the prepaid handset 102.

The account information 126 includes individualized information for each account associated with each prepaid handset 102 serviced by a network service provider, such as the information that specifies the amount of available communication for each prepaid handset 102. As the prepaid handset 102 communicates via the network 106, the server 108 modifies the account information 126 to reduce the remaining available amount of communication for the prepaid handset 102. Applying the predetermined credit amount or the stored credit value to the account information 126 for the prepaid handset 102 may include adding a specific number of minutes for customer communication to the account. Adding credit to the account information 126 may also enable bypassing of a standard credit activation requirement presented by an automated interactive voice message system, such as a requirement to enter a credit account card number.

After the server 108 applies the predetermined credit amount or the stored credit value to the account information 126 for the prepaid handset 102, the server 108 activates the prepaid handset 102 for customer communication. The server 108 may communicate via the network 106, which may communicate wirelessly with the base transceiver station 104, which may use wireless communication to activate the prepaid handset 102 for customer communication via "over-the-air" messaging. In an embodiment, over-the-air messaging comprises the prepaid handset 102 sending and receiving messages over a wireless communication link between the prepaid handset 102 and a radio access network (RAN), for example a wireless communication link provided by the base transceiver station 104. The server 108 may update the prior activations prepaid handset identifiers 122 and the prior activations subscriber identity module identifiers 124 in the prior activations list 120 based on the prepaid handset identifier 114 and the subscriber identity module identifier 118 for the prepaid handset 102 that the server 108 activated.

Figure 2:
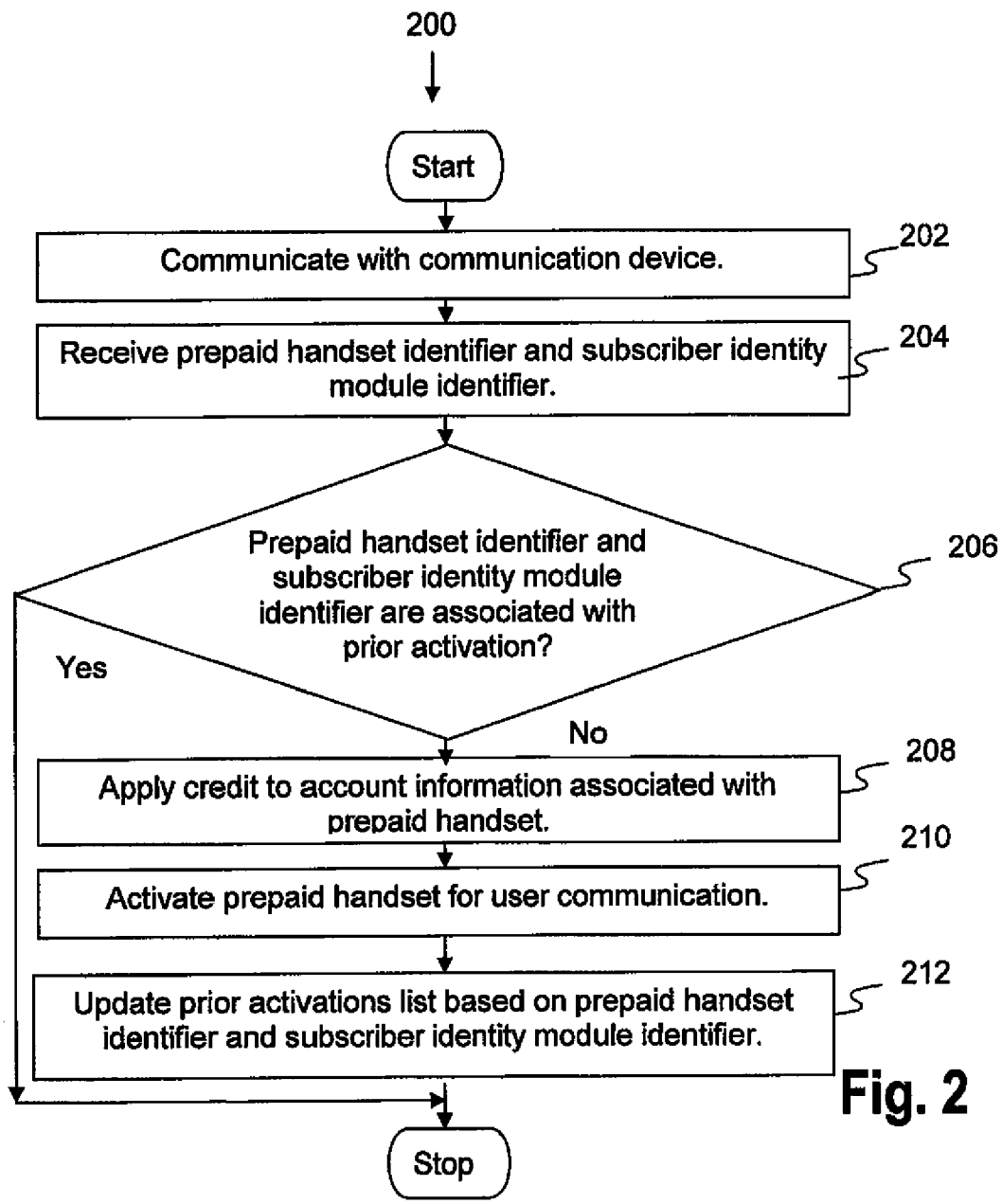
FIG. 2 shows a flowchart of a method for prepaid handset credit activation according to some embodiments of the present disclosure.

FIG. 2 shows a flowchart of a method 200 for prepaid handset credit activation according to some embodiments of the present disclosure. The system 100 can execute the method 200 to apply a predetermined credit amount to the account information 126 for the prepaid handset 102 and activate the prepaid handset 102 for customer communication.

In box 202, a communication device is communicated with. For example, a customer uses the communication device 112, which is another handset 102, to communicate with the server 108.

In box 204, a prepaid handset identifier and a subscriber identity module identifier are received. For example, the server 108 receives the prepaid handset identifier 114 and the subscriber identity module identifier 114 entered by the customer on the other handset 102. The customer does not have to enter any credit account card number.

In box 206, whether the prepaid handset identifier and the subscriber identity module identifier are associated with a prior activation is determined. For example, the server 108 determines whether the prepaid handset identifier 114 and the subscriber identity module identifier 118 were used for a prior activation based on the prior activations list 120. If the server 108 determines that both the prepaid handset identifier 114 and the subscriber identity module identifier 118 were used for a prior activation, the method terminates. If the server 108 determines that either the prepaid handset identifier 114 or the subscriber identity module identifier 118 was not used for a prior activation, the method continues to box 208.

In box 208, credit is applied to account information associated with the prepaid handset. For example, the server 108 applies a predetermined credit amount of $5 to the account information 126 for the prepaid handset 102.

In box 210, the prepaid handset is activated for user communication. For example, the server 108 communicates via the network 106 and the base transceiver station 104 to activate the prepaid handset 102 over the air for customer communication.

In box 212, a prior activations list is updated based on the prepaid handset identifier and the subscriber identity module identifier. For example, the server 108 updates the prior activations list 120 with the prepaid handset identifier 114 and the subscriber identity module identifier 118 for the activated handset 102.

Figure 3:
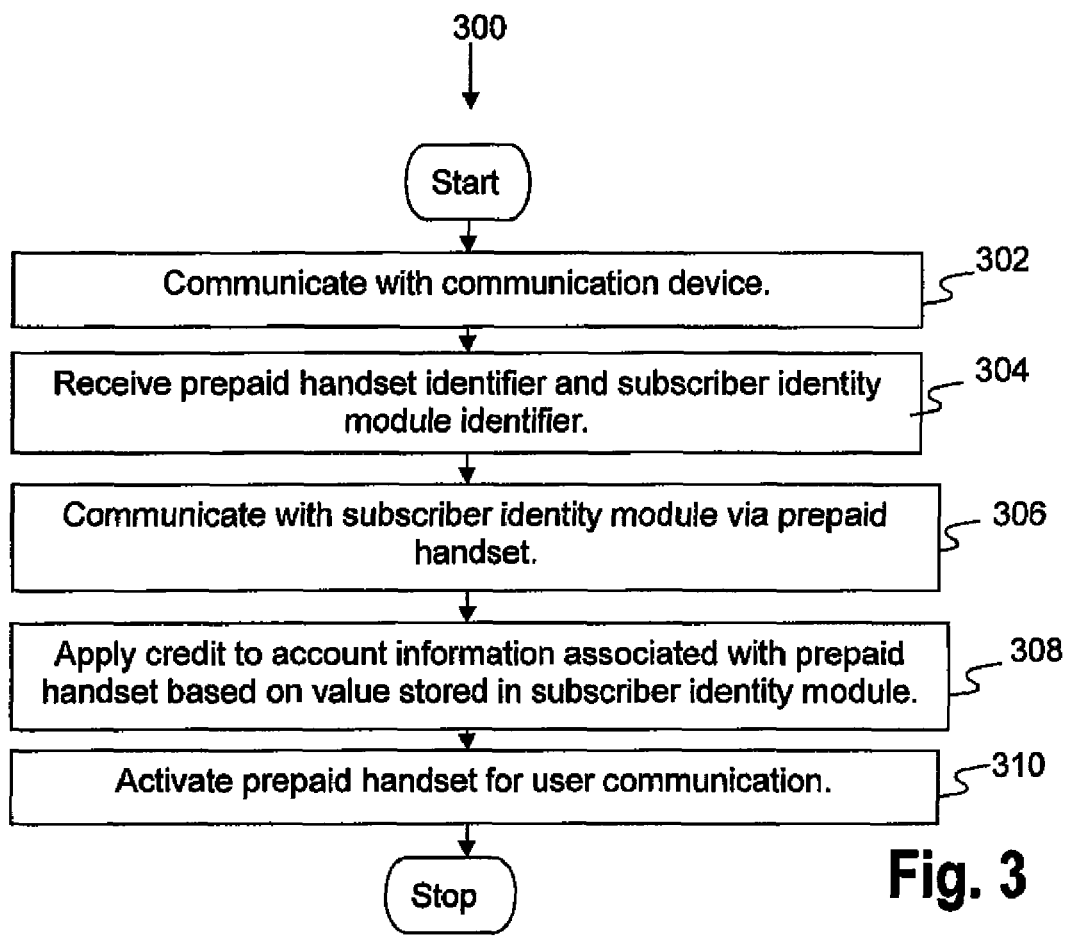
FIG. 3 shows a flowchart of another method for prepaid handset credit activation according to some embodiments of the present disclosure.

FIG. 3 shows a flowchart of a method 300 for prepaid handset credit activation according to some embodiments of the present disclosure. The system 100 can execute the method 300 to apply a credit value stored on the subscriber identity module 116 to the account information 126 for the prepaid handset 102 and activate the prepaid handset 102 for customer communication.

In box 302, a communication device is communicated with. For example, a customer uses the communication device 112, which is a personal computer, to communicate with the server 108.

In box 304, a prepaid handset identifier and a subscriber identity module identifier are received. For example, the server 108 receives the prepaid handset identifier 114 and the subscriber identity module identifier 118 entered by the customer on the personal computer 112. The customer does not have to enter any credit account card number.

In box 306, the subscriber identity module is communicated with via the prepaid handset. For example, the server 108 communicates via the prepaid handset 102 with the subscriber identity module 116 to determine the stored credit value in the subscriber identity module 116.

In box 308, credit is applied to account information associated with the prepaid handset based on a value stored in the subscriber identity module. For example, the server 108 applies the stored credit value of 20 minutes to the account information 126 for the prepaid handset 102.

In box 310, the prepaid handset is activated for user communication. For example, the server 108 communicates via the network 106 and the base transceiver station 104 to activate the prepaid handset 102 over the air for customer communication.

Figure 4:
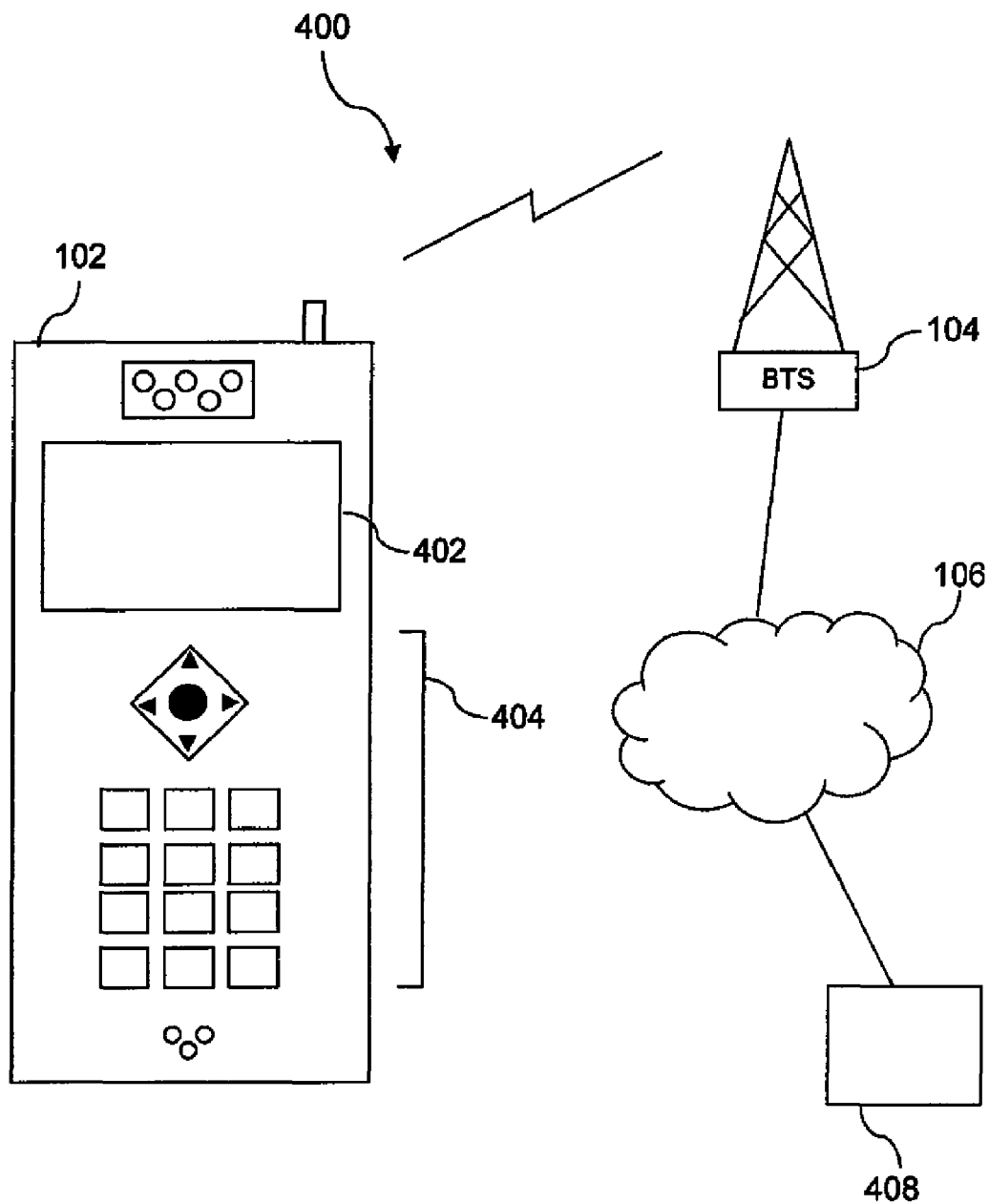
FIG. 4 shows an illustrative wireless communications system.

FIG. 4 shows a wireless communications system 400 including the handset 102, which may be referred to as the mobile device 102. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable mobile devices 102 combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example via a wireless communication link between the mobile device 102 and one of a wireless base station, a wireless access point, or a peer mobile device 102.

The mobile device 102 may execute a web browser application which enables the display 402 to show a web page. The web page may be obtained via wireless communications with the base transceiver station 104, a wireless network access node, a peer mobile device 102 or any other wireless communication network or system. While a single base transceiver station 104 is illustrated, it is understood that the wireless communication system may comprise additional base transceiver stations 104. In some instances, the mobile device 102 may be in communication with multiple base transceiver stations 104 at the same time. The base transceiver station 104 (or wireless network access node) is coupled to the network 106, such as the Internet. Via the wireless link and the wired network, the mobile device 102 has access to information on various servers, such as the server 408. The server 408 may provide content that may be shown on the display 402. Alternately, the mobile device 102 may access the base transceiver station 104 through a peer mobile device 102 acting as an intermediary, in a relay type or hop type of connection.

Figure 5:
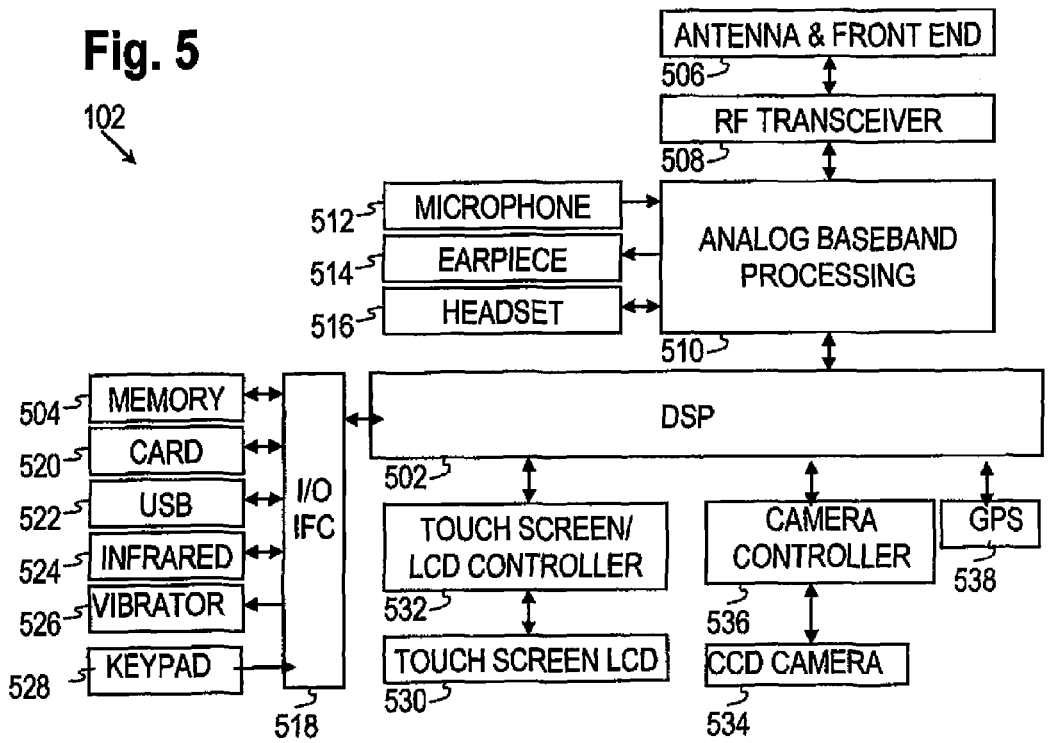
FIG. 5 shows a block diagram of an illustrative mobile device.

FIG. 5 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end unit 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile devices 102 and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
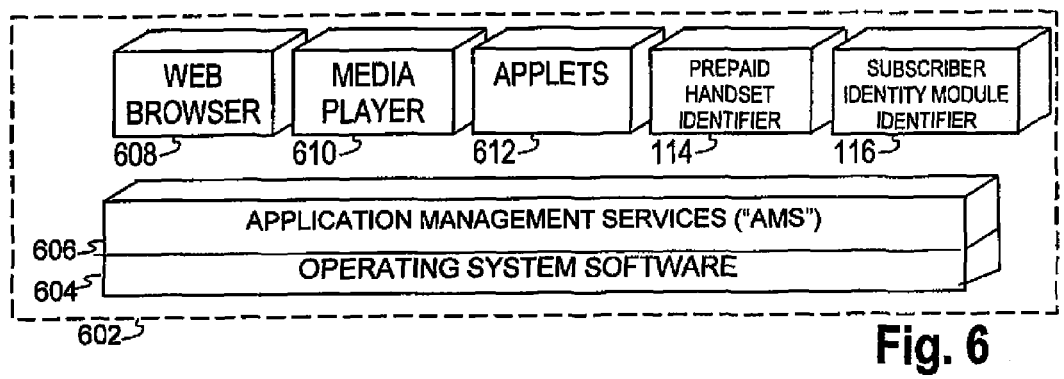
FIG. 6 shows a block diagram of an illustrative software configuration for a mobile device.

FIG. 6 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 102. Also shown in FIG. 6 are a web browser application 608, a media player application 610, JAVA applets 612, the prepaid handset identifier 114, and the subscriber identity module identifier 116. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
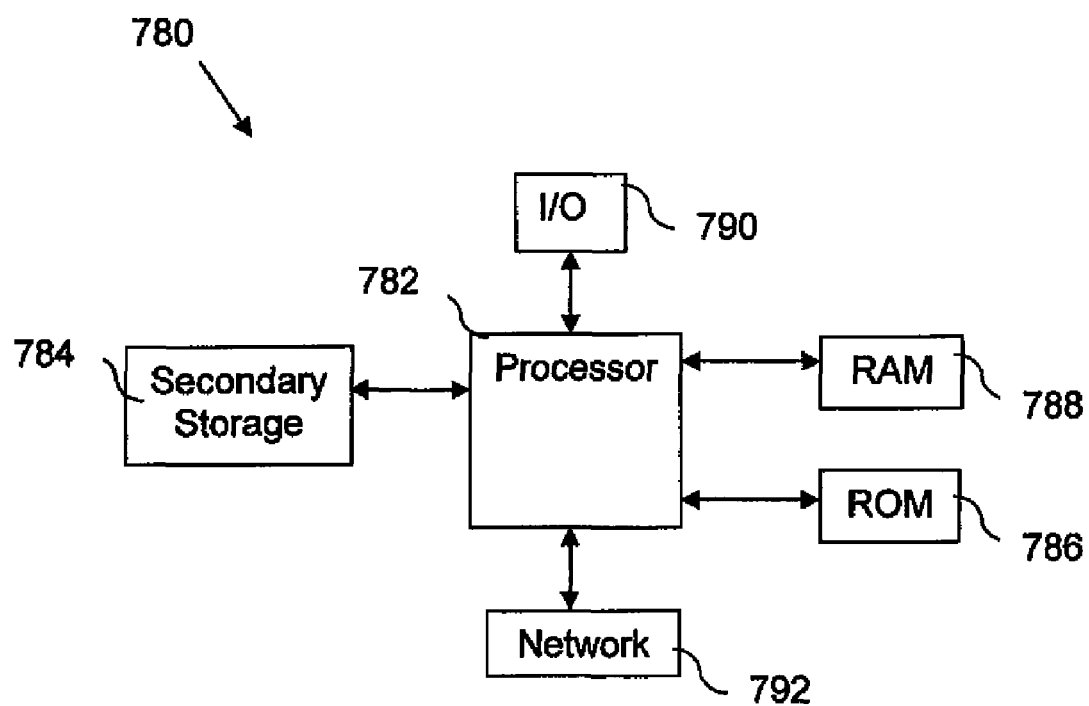
FIG. 7 shows an illustrative general purpose computer system suitable for implementing portions of the several embodiments of the present disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor 782, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for prepaid handset credit activation, comprising:
   a prepaid handset, wherein the prepaid handset is associated with a prepaid handset identifier;
   a subscriber identity module, wherein the subscriber identity module is associated with a subscriber identity module identifier; and
   a server to communicate with a communication device to receive the prepaid handset identifier and the subscriber identity module identifier, to determine whether both of the prepaid handset identifier and the subscriber identity module identifier are associated with prior activation, to apply credit to account information associated with the prepaid handset in response to a determination that both of the prepaid handset identifier and the subscriber identity module identifier are not associated with the prior activation,
      to activate the prepaid handset for user communication in response to applying the credit to the account information associated with the prepaid handset, and
      wherein the server determines whether both of the prepaid handset identifier and the subscriber identity module identifier are associated with the prior activation based on a prior activations list.

2. The system of claim 1, wherein the prepaid handset is associated with a prepaid billing plan.

3. The system of claim 1, wherein the communication device is one of a personal computer, a telephone, and another handset.

4. The system of claim 1, wherein the server communicates with the communication device via a customer care system.

5. The system of claim 1, wherein the server communicates with the communication device via a web browser.

6. The system of claim 1, wherein the server communicates with the communication device via an automated interactive voice message system.

7. The system of claim 1, wherein the server communicates with the communication device via text messages.

8. The system of claim 1, wherein the prior activations list comprises prior activations prepaid handset identifiers and prior activations subscriber identity module identifiers.

9. The system of claim 1, wherein the server is further configured to update the prior activations list based on the prepaid handset identifier and the subscriber identity module identifier.

10. The system of claim 1, wherein the server activates the prepaid handset for user communication via "over the air" messaging.

11. The system of claim 10, wherein the server communicates via a base transceiver station to activate the prepaid handset for user communication via "over the air" messaging.

12. The system of claim 11, wherein the server communicates with the base transceiver station via wireless communication.

13. The system of claim 12, wherein the server communicates with the base transceiver station via a communication network.

14. A method for prepaid handset credit activation, comprising:
   receiving a prepaid handset identifier and a subscriber identity module identifier;
   determining whether either of the prepaid handset identifier and the subscriber identity module identifier are associated with prior activation;
   applying credit to account information associated with the prepaid handset in response to a determination that either of the prepaid handset identifier or the subscriber identity module identifier are not associated with the prior activation;
   activating the prepaid handset for user communication in response to applying the credit to the account information associated with the prepaid handset, and wherein a server determines whether both of the prepaid handset identifier and the subscriber identity module identifier are associated with the prior activation based on a prior activations list.

15. The method of claim 14, wherein applying credit to the account information comprises adding a specific number of minutes for user communication to the account information.

16. The method of claim 15, wherein applying the credit to the account information enables bypassing of a standard credit activation requirement presented by an automated interactive voice message system.

17. A system for prepaid handset credit activation, comprising:
- a prepaid handset, wherein the prepaid handset is associated with a prepaid handset identifier;
- a subscriber identity module comprising a stored value, wherein the subscriber identity module is associated with a subscriber identity module identifier; and
- a server to communicate with a communication device to receive the prepaid handset identifier and the subscriber identity module identifier, to communicate with the subscriber identity module via the prepaid handset, to apply credit to account information associated with the prepaid handset based on the stored value, and to activate the prepaid handset for user communication, and wherein the server further to determine whether both of the prepaid handset identifier and the subscriber identity module identifier are associated with a prior activation based on a prior activations list.

18. The system of claim 17, wherein the stored value is associated with a specific number of minutes for user communication.

19. The system of claim 17, wherein the handset is at least one of a mobile phone, a wireless handset, a pager, a personal digital assistant, a gaming device, an inventory control device, a media player, a digital camera, a digital calculator, a portable computer, a tablet computer, and a laptop computer.

* * * * *